Feb. 12, 1963 R. C. LANGFORD ET AL 3,077,560
METHOD OF TESTING ELECTRONIC CIRCUITS AND COMPONENTS
Original Filed Sept. 20, 1954 3 Sheets-Sheet 1

INVENTORS
ROBERT C. LANGFORD and
FREDERICH W. SIPPACH JR
BY
ATTORNEY

Feb. 12, 1963 R. C. LANGFORD ET AL 3,077,560
METHOD OF TESTING ELECTRONIC CIRCUITS AND COMPONENTS
Original Filed Sept. 20, 1954 3 Sheets-Sheet 2
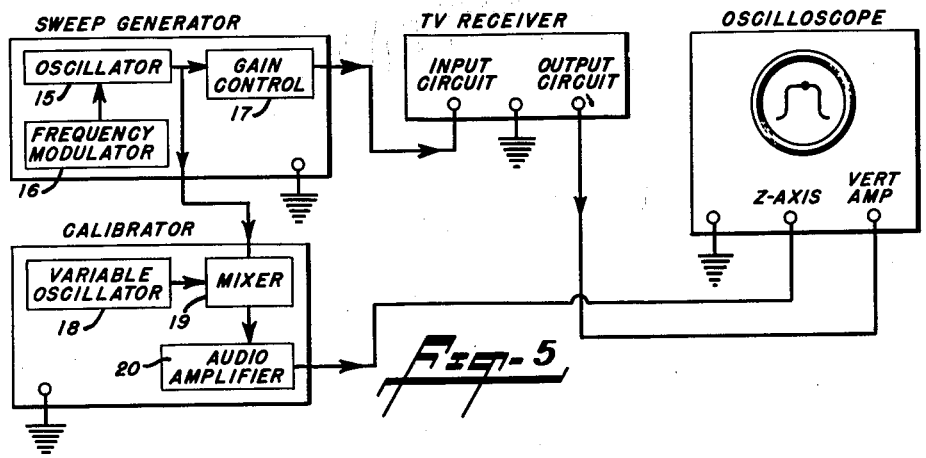
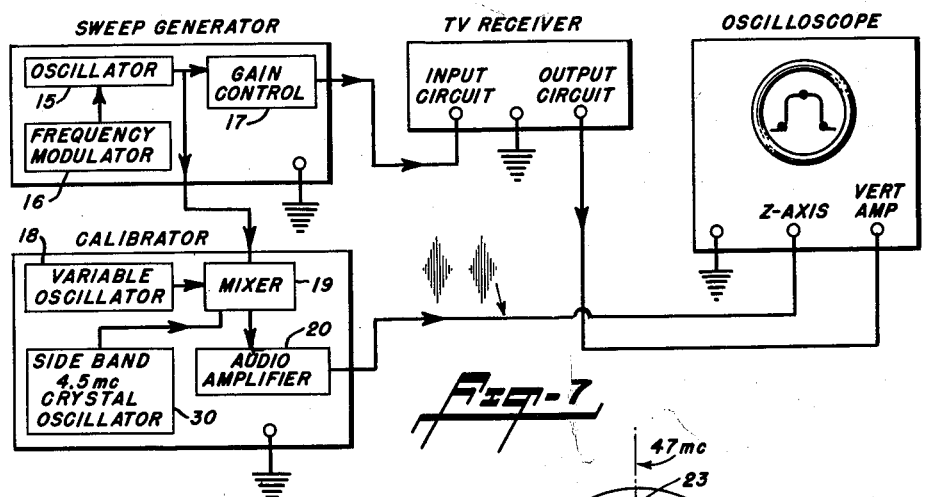
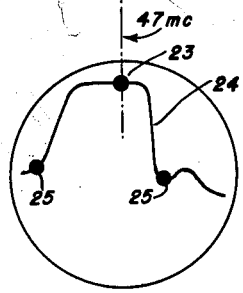
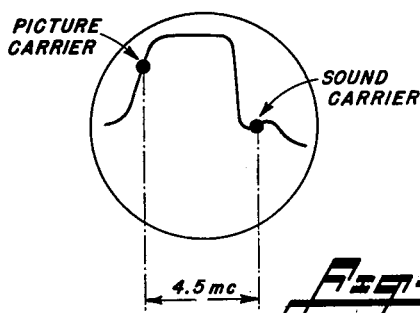
INVENTORS
ROBERT C. LANGFORD and
FREDERICH W. SIPPACH JR.
BY Rudolph J. Jurick
ATTORNEY Feb. 12, 1963  R. C. LANGFORD ET AL  3,077,560
METHOD OF TESTING ELECTRONIC CIRCUITS AND COMPONENTS
Original Filed Sept. 20, 1954  3 Sheets-Sheet 3
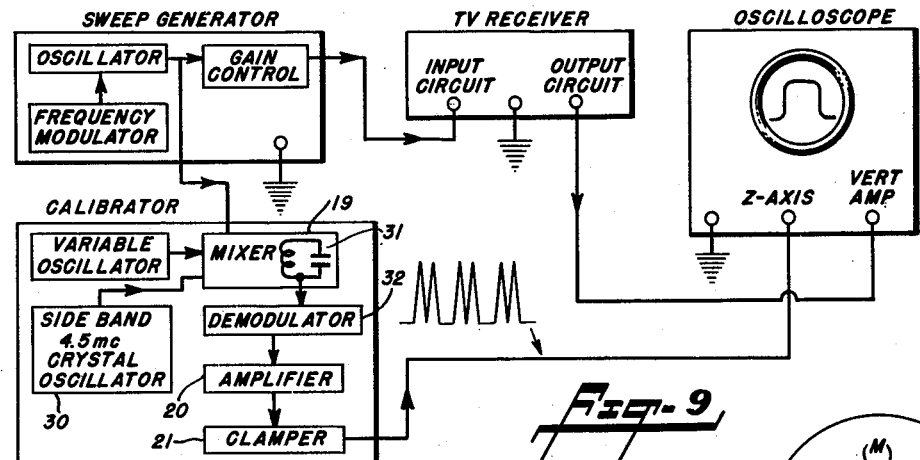
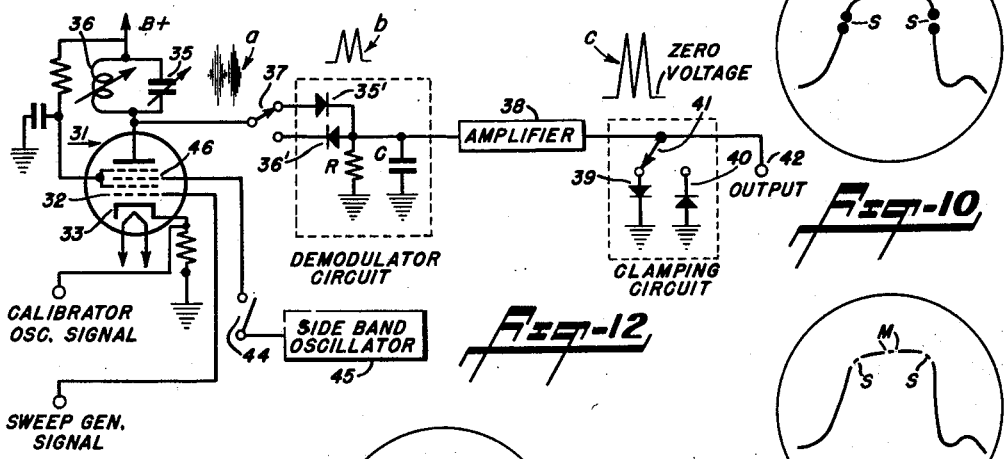
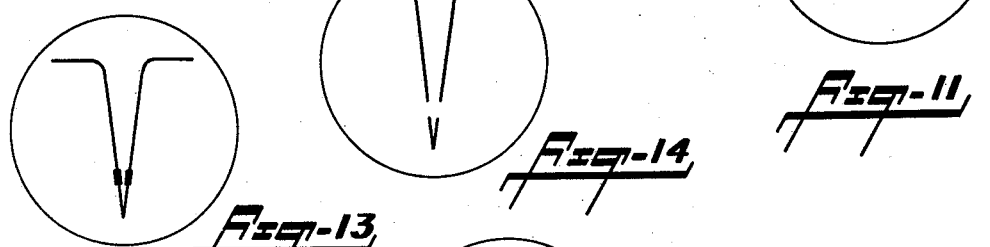
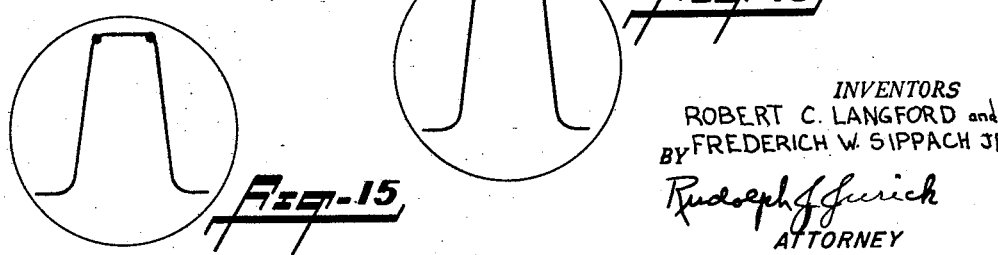
INVENTORS
ROBERT C. LANGFORD and
BY FREDERICH W. SIPPACH JR
ATTORNEY United States Patent Office 3,077,560
Patented Feb. 12, 1963

3,077,560
METHOD OF TESTING ELECTRONIC CIRCUITS AND COMPONENTS
Robert C. Langford, Elizabeth, and Frederick W. Sippach, Jr., Millburn, N.J., assignors, by mesne assignments, to Daystrom Incorporated, Murray Hill, N.J., a corporation of Texas
Original application Sept. 20, 1954, Ser. No. 457,014, now Patent No. 2,859,343, dated Nov. 4, 1958. Divided and this application Oct. 2, 1958, Ser. No. 773,126
4 Claims. (Cl. 324—57)

This invention relates to a method of checking the adjustment or alignment of electronic circuits and more particularly to a novel such method adapted for use in the visual method of aligning circuits and components particularly as incorporated in television receivers.

While the invention is of general utility the detailed description thereof will be restricted to its use in connection with the visual alignment of a television receiver.

This is a divisional application of our copending patent application Serial Number 457,014, now Patent No. 2,859,343, filed September 20, 1954, and entitled Method and Apparatus for Testing Electronic Circuits and Components.

Probably the greatest inherent defect in television sets, aside from deteriorated tubes, is improper or poor receiver alignment. The term "visual alignment" is generally used to denote a test procedure of depicting in graphic curve form on an oscilloscope screen the response of the resonant circuits of a TV receiver system to a constant-voltage, swept-frequency signal so that the circuits can be adjusted to conform as closely as possible to the individual overall frequency responses as specified by the manufacturer of the device. The pattern or wave form observed on the oscilloscope is referred to as a response curve which, in reality, is a voltage versus frequency relation. The problem of TV receiver alignment, then, essentially is one of producing the response curves as specified by the particular manufacturer.

In shaping the response curve of a TV receiver several factors must be considered. The trap circuits must be properly adjusted to obtain specific points of minimum output on the response curve since the function of the trap circuits is either to absorb energy or cause a loss in gain at a particular resonant frequency. The bandwidth of a tuned circuit is a means of expressing the difference between its limiting frequencies at the 3 db point (70.7% of maximum amplitude). Stated otherwise, bandpass circuits are selective circuits which accept and pass a certain band or range of frequencies and reject all others and the acceptable band of frequencies is referred to as the band width of the tuned circuit. Proper operation of a TV receiver requires a proper adjustment of the bandpass circuits.

In the visual alignment procedure the TV technician is principally concerned with the overall video response curve from the antenna terminal to the second video detector since it is this response curve which, in the final analysis, will determine the quality of TV picture reception.

The equipment used in the visual alignment of the receiver consists of a sweep generator, a frequency calibrator and an oscilloscope. It is the standard practice to connect such equipment to the receiver under test in such manner that the calibrator signals are passed through the TV set together with the sweep generator input and the oscilloscope is responsive to the combined signals appearing at the second video detector stage. Although the calibrator signal can be injected at a point other than that at which the sweep signal is injected, the calibrator cable generally is loosely coupled to the input cable of the sweep generator. Such coupling is extremely critical and involves considerable experimentation before the exact required coupling is obtained. With this conventional method of test hook-up, it also becomes essential that the signal amplitude of the calibrator be kept at a minimum in order not to distort the response curve on the oscilloscope screen. Numerous other practical disadvantages are inherent in the present visual alignment procedure and these will be pointed out hereinbelow. It is well to here point out, however, that when it is desired to adjust a resonant trap, i.e., at the point of zero voltage, the output of the TV set at the cut off frequency is zero and hence the marker pip, on the oscilloscope screen, since it goes through the TV set, disappears altogether just when it is needed most.

The above stated and numerous other inherent disadvantages in the present visual alignment procedure are overcome by the novel method of our invention. In our method, it is not necessary to connect or couple the calibrator to the TV receiver. A portion of the sweep generator signal is fed into the TV receiver as in the conventional test hook-up. Another portion of the sweep signal is then fed to the calibrator where it is mixed. The resulting beat signal is amplified and then fed directly to the Z-axis, or intensity modulated terminal, of the oscilloscope. The calibrator coupling to the receiver is entirely eliminated.

By utilizing our method of calibrator signal insertion directly into the oscilloscope it is possible to display on the screen at all times accurate intensity markers over the entire response curve of the TV receiver even at trap frequencies. In one form of our method, two sharp, bright dots of light occur on the wave trace at whatever frequency the calibrator is set. The center between these dots is the correct center frequency. This method of presentation is referred to herein as positive, Z-axis intensity modulation.

Negative Z-axis intensity modulation is also possible. With this method, two blanked-out portions spaced by a short white line appear on the oscilloscope screen. The blanked-out portions of the curve are spaced apart 150 kilocycles from the center line frequency, the center line frequency being actually the precise calibrator frequency.

The negative or positive marker display on the oscilloscope screen can be selected depending upon individual preference.

With our simplified method of visual alignment, it is also possible to display multiple markers simultaneously on the oscilloscope screen. This is particularly useful in observing the sound and video carrier simultaneously in an overall response check of the television receiver. Also, band width checks are conveniently made by adding 1.5 and 4.5 megacycle marker frequencies.

An object of this invention is the provision of a novel visual method of aligning electronic circuits, particularly those of a television receiver.

An object of this invention is the provision of a novel method for use in the visual alignment of a television receiver whereby there is produced on the receiver response curve double markers at selected frequencies, said double markers being of a character readily distinguishable from spurious beats on the sweep pattern of an oscilloscope.

An object of this invention is the provision of a method for determining the response curve of a TV receiver, which method comprises feeding a portion of a sweep generator signal to the receiver, feeding a portion of such sweep generator signal to a calibrator, mixing the generator and calibrator signals, amplifying the resultant signal and impressing same directly upon the Z-axis of an oscilloscope, said oscilloscope also being responsive to output signals from the receiver.

These and other objects and advantages of the invention will become apparent from the following description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

FIGURE 5 is similar to FIGURE 4 but presenting more of the apparatus components for a better understanding of the invention;

FIGURE 6 illustrates the signal trace displayed on the oscilloscope screen when using the FIGURE 5 arrangement;

FIGURE 7 is similar to FIGURE 5 and including a 4.5 megacycle side band oscillator for providing visible markers on the signal trace at the trap settings;

FIGURE 8 illustrates the signal trace displayed when the FIGURE 7 arrangement is used;

FIGURE 9 is a modification of the FIGURE 7 arrangement whereby there is displayed on the oscilloscope a clearly visible double marker that is readily distinguishable from any spurious beats present on the sweep pattern;

FIGURE 10 illustrates such double marker presentation in the case of positive Z-axis modulation of the oscilloscope;

FIGURE 11 illustrates such double marker presentation in the case of negative Z-axis modulation of the oscilloscope;

FIGURE 12 is a circuit diagram of the novel circuit for producing the double marker presentation;

FIGURES 13 and 14 illustrate, respectively, the double spot and double space marker presentation as a means for accurately setting trap circuits; and FIGURES 15 and 16 illustrate, respectively, the double spot and double space marker presentation as a means for checking the width of a band pass circuit.

Figure 1:
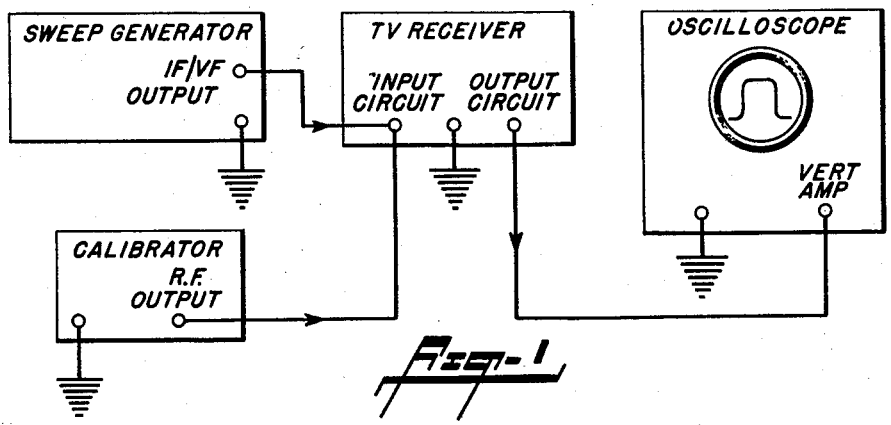
FIGURE 1 is a block diagram illustrating the apparatus and hook-up as used in the practice of the conventional visual alignment procedure.

Reference is now made to FIGURE 1 which illustrates in block diagram form the apparatus and hook-up for the conventional visual method of aligning a TV receiver. It will be observed that the sweep generator signal and the calibrator signal are both passed through the receiver and then applied to the vertical amplifier of the oscilloscope. In actual practice the sweep generator and calibrator signals are fed to the antenna or input circuit of the receiver and the output circuit taken to the oscilloscope is usually at the second video detector stage. However, for present purposes it is believed the simplified hook-up arrangement shown in FIGURE 1 provides a basis for a quick comparison between the present practice and that of our invention.

Figure 2:
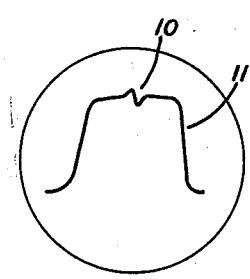
FIGURE 2 illustrates a hypothetical, perfect response curve of a TV receiver as evidenced by the signal trace appearing on the screen of the oscilloscope in the FIGURE 1 arrangement.

FIGURE 2 illustrates a hypothetical, perfect wave pattern, or trace, obtained in the FIGURE 1 arrangement. The small marker pip 10, seen on the trace 11, marks the frequency of the calibrator signal and the precise frequency of such pip is obtained from a suitably calibrated dial provided on the calibrator.

In practicing the conventional method of visual alignment, the calibrator cable generally is loosely coupled to the input cable of the sweep generator. This coupling is extremely critical and involves considerable experimentation before the exact required coupling is obtained. Further, the presence of the two input leads to the TV receiver frequently causes the receiver to break into oscillation and elaborate steps have to be taken to prevent such oscillation without interfering with the correct alignment of the receiver. The presence of these two leads also can cause some detuning of the coils to take place. Often the introduction of the radio frequency signal of the calibrator can cause distortion of the sweep generator signal at a point very near the marker pip and other spurious responses may further result from harmonics of the radio frequency signal passing through the TV receiver. Consequently, the signal amplitude of the calibrator signal must be kept at a minimum in order not to distort the response curve on the oscilloscope screen.

Another serious practical limitation of the conventional visual alignment technique resides in the fact that since the marker pip signal passes through the TV receiver such pip disappears altogether just when it is most needed; namely, to adjust a resonant trap circuit. Obviously, such adjustment is made at the zero voltage point at which time the receiver output is zero.

Figure 3:
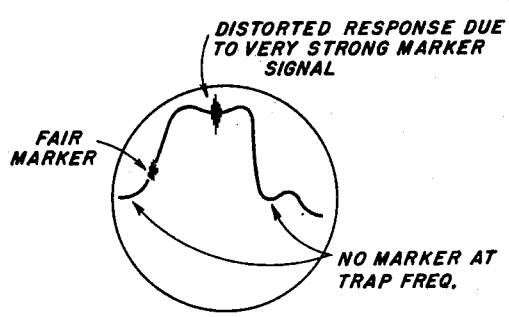
FIGURE 3 illustrates an actual signal trace of a TV receiver as usually obtained with the FIGURE 1 arrangement.

FIGURE 3 illustrates an actual signal trace or wave pattern displayed on the oscilloscope screen in the FIGURE 1 arrangement and includes legends pointing out the defects inherent in such visual alignment procedure.

Figure 4:
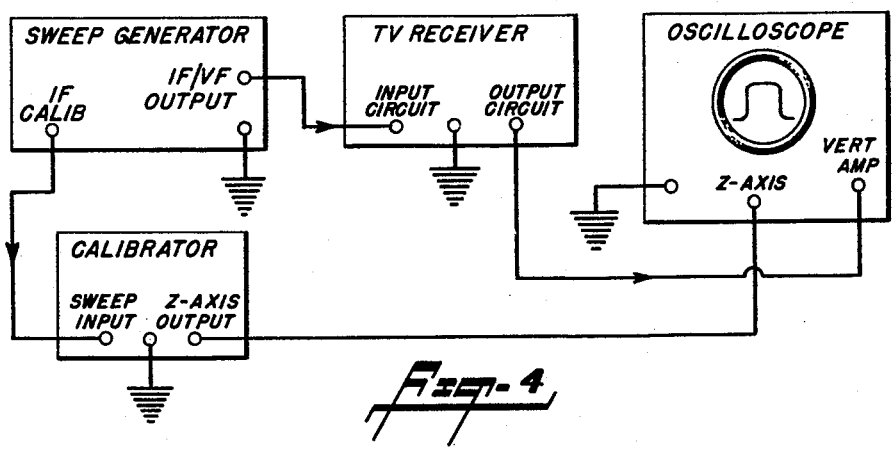
FIGURE 4 is a block diagram similar to FIGURE 1 but showing the practice of our improved visual alignment procedure.

Reference is now made to FIGURE 4 which is a block diagram similar to FIGURE 1 but showing the novel arrangement in accordance with this invention. It will immediately be noted that the calibrator signal does not pass through the receiver. A portion of the sweep generator signal is fed into the receiver as in the conventional arrangement. Another portion of the sweep generator signal is fed to the calibrator where it is mixed with the calibrator signal, further amplified and directly fed to the Z-axis intensity modulation terminal of the oscilloscope. The calibrator coupling to the receiver is entirely eliminated. By utilizing this method of calibrator, or marker, signal insertion into the oscilloscope, it is possible to display at all times accurate intensity markers on the entire response curve of the receiver even at trap frequencies.

Reference is now made to FIGURE 5 which is a somewhat expanded version of the FIGURE 4 arrangement. Here the sweep generator is shown as consisting of an oscillator 15 controlled by a frequency modulator 16 and including a gain control 17. Generally, the sweeping action of the generator is produced by a precision mechanical modulator that alters the capacity in the tank circuit of the oscillator and with it the frequency of the oscillator at a 60 cycle rate. In general, a good sweep generator should produce accurate frequency modulated signals that are fundamentals of the oscillator frequency and not harmonics and the bandwidth sweep should be at least 10 megacycles for all television channels in order to depict a complete response curve on the oscilloscope screen. Linearity of sweep is important in order not to produce a distorted response curve which makes interpretation of receiver operation indefinite.

The calibrator comprises a variable frequency oscillator 18, mixer 19 and amplifier 20. The purpose of the calibrator is to provide known frequencies with which to identify the various marker points on the response curve, which points must be established with a fairly high degree of accuracy. Since even the best oscillator circuits are subject to drift it is customary to provide some means for periodically checking the accuracy of the indicating dial. This is usually done by checking the dial readings against selected harmonics of a crystal controlled oscillator and making the necessary correction in the dial setting.

It will be assumed the sweep generator is supplying a frequency modulated signal varying between 44 and 50 megacycles at a rate of 60 cycles per second and that the frequency of the variable oscillator 18 is fixed at 47 megacycles. These two signals are introduced into the mixer 19 to produce sum and difference products. Consequently, the output of the mixer contains several high frequency signals and a frequency modulated signal varying from 3 to 0 to 3 megacycles. These signals are applied to the audio amplifier 20 which has zero response to all frequencies except very low frequencies, substantially D.-C. Consequently, the output of this amplifier will be zero at all points except that at which the frequency-modulated input signal crosses the fixed frequency, that is, 47 megacycles. Such amplified signal is fed to the Z-axis control of the oscilloscope causing a brightening of the wave pattern at the 47 megacycle frequency of the calibrator oscillator. FIGURE 6 illustrates such bright spot 23 on the average response curve 24 of the TV receiver under test. Thus, even when the response of the TV receiver is zero, as at the traps, a clear indication of the frequency of the calibrator may be displayed on the pattern as, for example, is shown by the position of the spots 25, FIGURE 6. There is now only one input signal to the TV set thereby reducing the possibility of detuning and oscillation. The calibrator injects no radio frequency signal into the receiver and hence there will be no spurious responses due to harmonics, etc.

Side band markers on the oscilloscope screen are extremely useful and save a good deal of time in the alignment of intercarrier type television receivers. such markers can readily be provided by the modified arrangement shown in FIGURE 7. It will be recognized that FIGURE 7 is identical to FIGURE 5 except for the added crystal-controlled side-band oscillator 30 which inserts a 4.5 megacycle signal into the mixer 19 forming part of the calibrator. This results in a series of marker pulses being applied to the Z-axis control element of the oscilloscope, such pulses being spaced apart 4.5 megacycles. The resulting response cure is shown in FIGURE 8.

The arrangements shown in FIGURES 5 and 7 are referred to as positive Z-axis modulation since the electron beam of the oscilloscope is modulated so as to provide bright dots of light on the wave trace at points corresponding to the calibrator frequency or frequencies. Negative Z-axis modulation would result in small breaks appearing in the wave trace in place of the bright dots of light. In the former case, positive control signals are applied to the grid of the cathode ray tube whereas in the latter case negative signals are so applied.

In order to provide precise frequency indications, it is desirable to produce a stable marker that is not subject to fluttering resulting from random frequency and phase changes between the sweep oscillator and the calibrator oscillator. FIGURE 9 illustrates, in block diagram form, an arrangement wherein the marks displayed on the oscilloscope screen are clearly visible and readily differentiated from any spurious beats present on the sweep pattern. Specifically, a tuned circuit 31 is included in the output circuit of the mixer 19 in such a way that the mixer output is a double-peaked envelope containing only the frequencies of the tuned circuit. This signal is demodulated by the demodulator 32, amplified by the amplifier 20 and clamped to ground by the clamper 21 and the resulting double-peaked pulses are applied to the Z-axis control element of the oscilloscope. The markers will now appear as double spots in the case of positive intensity modulation (as shown in FIGURE 10) or double spaces, or dark spots, in the case of negative intensity modulation (as shown in FIGURE 11). The point half way between the adjacent spots or spaces represents the point at which the sweep signal frequency passes through the calibrator oscillator frequency.

Reference is now made to FIGURE 12 for a detailed description of the novel circuit for producing the double marker signals. The input signals are applied to a nonlinear mixer device such as the electron tube 31 which may be a type 6BA7. Specifically, the sweep generator signal is applied to the first control grid 32 and the calibrator oscillator signal is applied to the cathode 33. As explained hereinabove, for purposes of testing a television receiver the sweep generator signal is frequency modulated between 44 and 50 cycles per second at a 60 cycle rate and the calibrator signal is of a fixed, known frequency within the range of the sweep generator signal as, for example, 47 megacycles. When such signals are introduced into the mixer tube they produce sum and difference frequencies. Consequently, the signal in the mixer anode circuit contains numerous high frequency signals and a frequency modulated signal varying from 3 to 0 to 3 cycles per second. A tunable circuit, consisting of the variable capacitor 35 and inductance 36 is connected in the mixer anode circuit as shown. This circuit is tuned to a selected frequency as, for example, 75 kilocycles. Thus, the tuned circuit will reject component signals having relatively low frequencies such as arise from random frequency and phase changes between the sweep generator and calibrator signals. The circuit is further tuned sharply so that it passes only those signals which appear as a double-peaked envelope as shown in the wave pattern "a." These double-peaked envelope signals contain only the frequencies that are close to the resonant frequency of the tuned circuit and the peaks of the envelopes are spaced from each other by twice the resonant frequency of the tuned circuit; namely, 150 kilocycles which corresponds to the allowable bandwidth allocated to the frequency modulated sound carrier in television broadcasting. These envelope peaks are equally spaced to either side of the zero beat point between the two input signals so that the point midway between the peaks represents the fixed, known frequency of the calibrator signal and occurs at the instant the sweep generator frequency passes through the calibrator frequency.

The elimination of the difference frequencies in the audio range which waver due to unavoidable random frequency and phase changes between the two input signals removes the possibility of fluttering of the marker signal. Also, power line noises are similarly eliminated and the remaining double-peaked-envelope signal is clear and stable.

The double-peaked envelope signal is demodulated by the demodulator circuit comprising one or the other of the reversely-disposed diodes 35', 36', the resistor R and the capacitor C. The time constant of the RC network is made sufficiently greater than the period of the frequencies under the double-peaked marker envelope so that only the double-peaked envelope remains, as shown by the wave pattern "b." This pattern has a repetition rate equal to the modulation rate of the sweep generator and the polarity of the pulses is determined by the setting of the switch 37.

The double-peaked pulses, of a selected polarity, are amplified in a conventional manner by an amplifier 38 to provide a desired pulse amplitude. In order to eliminate any overshoot effect resulting from such amplification, the amplified signal pulses are clamped to ground level by the clamping circuit comprising one or other of the grounded diodes 39 and 40 as selected by the setting of the switch 41. Those skilled in this art will understand that the switches 37 and 41 may be coupled together mechanically so as to connect the proper associated diodes into the circuit in order to provide double pulse marker signals of a selected polarity at the output terminal 42 of the apparatus.

The circuit also allows additional frequency marker signals to be developed simultaneously with the main marker signal. This is done by modulation of the main marker frequency in such a way as to produce side-band components spaced on either side of the main marker frequency at integral multiples of the modulation frequency. Such side-band marker signals have the same double-peaked presentation as the main marker with all of the desirable features and may be turned on or off at will by the switch 44 that connects the output of the side-band oscillator 45 to the second control grid 46 of the mixer tube. If, now, the apparatus output terminal 42 is connected to the electron beam intensity control element of the oscilloscope, the marker signal presentation on the oscilloscope screen will appear as shown in FIGURES 10 and 11. Specifically, FIGURE 10 illustrates the simultaneous presentation of positive double marker spots at the main frequency M and the side-band frequencies S, while FIGURE 11 illustrates the same presentation in the case of the negative double-space arrangement.

While we prefer to inject the double marker signals upon the Z-axis intensity modulation terminals of the oscilloscope to provide the double-spot or double space presentation it is apparent that such signals can be applied to the vertical amplifier of the oscilloscope. In the latter case there is presented on the oscilloscope screen clearly recognizable markers free of wavering effects.

The FIGURE 12 circuit is particularly convenient for accurately setting trap circuits. This is done by tuning the circuit in the mixer tube output so that two spots, or two spaces, appear on either side of the trap pattern and directly opposite each other as shown by the wave traces of FIGURES 13 and 14. The precise frequency setting of the trap is half way between the dots or spaces.

Further, and importantly, the double marker circuit of FIGURE 12 can be used for the accurate bandwidth settings of narrow bandpass circuits. The marker signals are spaced apart by twice the frequency of the tuned circuit in the mixer output and such circuit can be tuned to the bandwidth of the circuit under test, as illustrated in FIGURES 15 and 16. The point midway between these markers represents the actual frequency of the calibrator oscillator. Inasmuch as the bandwidth settings actually are independent of the marker center frequency this system is highly valuable in applications where the ratio of the center frequency to bandwidth is very high.

While we have specifically described the application of the double marker system to the visual alignment of a TV receiver, and to the setting of bandpass and trap circuits it will be apparent that the system has a broader scope of use. By virtue of stability of the marker signals produced, the system can be used to trigger other circuits. The frequency spacing between the double-peaked pulses forming a marker signal may be contracted or expanded by simply adjusting the resonant point of the tuned circuit in the mixer output with proper consideration being given to the frequency of the signals applied to the mixer. When the input signals have a frequency in the range of megacycles a tuning of the mixer output circuit to resonance at a frequency 60 to 200 kilocycles provides a distinguishable spread between the double-peaked envelopes. Obviously, when the frequency spread between the double peaks is too narrow the double dots, or spaces, on the oscilloscope screen will merge with each other, and the pattern becomes indefinite because of flutter, whereas too large a frequency spread renders indefinite the midpoint between the peaks. For purposes of testing a TV receiver we have found that a practical marker signal spread is obtained when the mixer output circuit is tuned to resonance at 75 kilocycles.

Further, while the circuit diagram of FIGURE 12 illustrates an electron tube as the mixer it will be understood that any non-linear mixer network capable of producing an output that is the difference frequency between two input signals will function to produce the double-peaked envelope signals by incorporating the tuned circuit in the mixer output.

From the above description of our invention, those skilled in this art will appreciate the following practical advantages thereof.

(1) It produces a stable marker signal presentation that is not subject to flutter resulting from changes in the sweep oscillator and/or calibrator oscillator frequencies.

(2) It produces a clearly visible marker that is readily differentiated from any spurious beats present on the sweep pattern.

(3) It produces a visual marker on the oscilloscope screen without injection of the calibrator signal into the circuits under test thereby eliminating any possibility of overloading and oscillation of such circuits.

(4) It produces visual markers that are completely independent of the circuits under test whereby the markers are visible even when the circuits have a zero or low response to the sweep signal.

(5) It allows for the convenient addition of side band markers in such a way that these markers offer the advantages of the main marker as to stability and clarity. These side band markers can be readily turned off for identification of the main marker.

(6) It allows for accurate setting of trap circuits.

(7) It permits accurate bandwidth settings of very narrow bandpass circuits by virtue of the double spot or double space presentation.

Having now described our invention in detail in accordance with the requirements of the patent statutes various changes and modifications will suggest themselves to those skilled in this art, and it is intended that such changes and modifications shall fall within the spirit and scope of the invention as recited in the following claims.

We claim:

1. A method of obtaining the response curve of an electronic circuit which method comprises directly applying a signal which consists of a frequency modulated wave substantially linearly varying between first and second frequencies to the input terminals of the circuit, impressing the output signal from the circuit upon the electron-beam-deflection input of an oscilloscope, mixing the frequency modulated wave with a wave of known frequency to thereby produce modulated signals having frequencies that are the difference of the frequency modulated wave and the wave of known frequency, tuning out of the last-mentioned modulated signals all signals except those having double-peaked-envelopes, and applying the double-peaked-envelope signals to the intensity control element of the oscilloscope electron beam.

2. The method set forth in claim 1 which includes demodulating the double-peaked-envelope signals before applying them to the intensity control element of the oscilloscope electron beam.

3. The method set forth in claim 2 which includes the addtional step of:
   clamping the demodulated signals to a point of reference potential before applying them to the intensity control element of the oscilloscope electron beam.

4. The method set forth in claim 1 which includes the addtional step of:
   mixing a third signal having a second known fixed frequency with the frequency modulated wave and the wave of known frequency thereby to produce additional modulated signals having frequencies that are the difference of the frequency modulated wave and the second third signal of second known frequency.

References Cited in the file of this patent

UNITED STATES PATENTS

| | | |
|---|---|---|
| 2,534,957 | Delvaux | Dec. 19, 1950 |
| 2,600,973 | Comte | June 17, 1952 |
| 2,610,228 | Devine | Sept. 9, 1952 |
| 2,684,467 | Young et al. | July 20, 1954 |
| 2,763,835 | Lundgren | Sept. 18, 1956 |
| 2,859,343 | Langford et al. | Nov. 4, 1958 |